United States Patent [19]

Singh

[11] 4,449,400

[45] May 22, 1984

[54] RADIONUCULIDE COUNTING TECHNIQUE FOR MEASURING WIND VELOCITY AND DIRECTION

[75] Inventor: Jag J. Singh, Yorktown, Va.

[73] Assignee: The United States of America as represented by the Administrator of the National Aeronautics and Space Administration, Washington, D.C.

[21] Appl. No.: 444,149

[22] Filed: Nov. 24, 1982

[51] Int. Cl.³ .......................... G01F 1/28; G01W 1/00
[52] U.S. Cl. .................................. 73/189; 73/861.71; 250/356.1
[58] Field of Search ................ 73/189, 861.71, 861.74, 73/861.75, 861.76; 250/356.1, 356.2, 357.1

[56] References Cited

U.S. PATENT DOCUMENTS

| | | |
|---|---|---|
| 2,700,899 | 2/1955 | Myers . |
| 2,735,300 | 2/1956 | Dungan et al. . |
| 2,780,937 | 2/1957 | Haynes et al. .......................... 73/189 |
| 2,913,900 | 11/1959 | Andrews .......................... 73/861.71 |
| 3,552,204 | 1/1971 | Tourmen .............................. 73/189 |
| 4,024,761 | 5/1977 | Djorup . |
| 4,035,656 | 7/1977 | Krisst ............................... 250/356.2 |
| 4,152,933 | 5/1979 | Woodhouse . |
| 4,206,638 | 5/1980 | Djorup . |
| 4,206,639 | 5/1980 | Balser . |
| 4,334,430 | 6/1982 | Hansen .................................. 73/189 |

Primary Examiner—Herbert Goldstein
Attorney, Agent, or Firm—Howard J. Osborn; John R. Manning; William H. King

[57] ABSTRACT

An anemometer utilizing a radionuclide counting technique for measuring both the velocity and the direction of wind. A pendulum 12 consisting of a wire 13 and a ball 14 with a source of radiation 15 on the lower surface of the ball is positioned by the wind. Detectors 16, 17 and 18 are located in a plane perpendicular to pendulum 13 (no wind). The detectors are located on the circumference of a circle and are equidistant from each other as well as the undisturbed (no wind) source ball position. The ratio of the outputs of detectors 16 and 17, and the ratio of the outputs of detectors 17 and 18 are applied to a processor 23 to select from the data stored in the processor the wind velocity V and the wind direction $\phi$.

In a second embodiment of the invention (FIG. 10) the pendulum consists of a wire 27, a heavy ball 24, a string 28 and a lighter ball 25 with radiation sources on the lower surfaces of both balls.

5 Claims, 11 Drawing Figures

RADIONUCULIDE COUNTING TECHNIQUE FOR MEASURING WIND VELOCITY AND DIRECTION

ORIGIN OF THE INVENTION

The invention described herein was made by an employee of the U.S. Government and may be manufactured and used by or for the Government for governmental purposes without the payment of any royalties thereon or therefor.

BACKGROUND OF THE INVENTION

The invention relates generally to anemometers and more specifically concerns an anemometer that utilizes a radionuclide counting technique for measuring both the direction and velocity of wind.

There are several types of anemometers currently in use for both applied research and industrial applications. Many types of anemometers are designed to furnish only a single component of wind velocity; cup anemometers are an example. However, some physical situations warrant knowledge of the three components of wind velocity. Appropriate anemometers have been designed to furnish this information. A discussion of the advantages and the limitations of various types of anemometers can be found in Kaimal, J.C., Sensors and Techniques for Direct Measurement of Turbulent Fluxes and Profiles in the Atmospheric Surface Layer., Atmos. Technol., No. 7, Fall 1975, pp. 7–14. The characteristics of some of them are briefly summarized below.

The hot wire and hot film type anemometers, which depend on the cooling power of the wind, are in general of small size and well suited for use in a wide range of atmospheric pressures. For transient flow measurements, the hot wire anemometer has no rival. Its frequency response extends to several hundred kHz. However, calibration is found to change with ambient temperature, with contamination of the wire, and with prolonged use. The hot wire instruments are fragile and not very suitable for large wind direction fluctuations. The hot film instruments, on the other hand, are more rugged and also offer the advantage of substantial signal-to-noise ratio gain due to the high resistance of the film, though their frequency response extends only to a few kHz. The main use of the hot film anemometers has been the measurement of turbulent liquids, though they can be used for the measurement of turbulent fluctuations in gases as well.

The three-axis sonic anemometer is based on the fact that the speed of sound increases or decreases depending on whether the sound is traveling in the direction of the wind or against the wind. This anemometer simultaneously measures the three components of velocity and seems to be sensitive only to wind components along the acoustic paths. Its frequency response is limited only by path length, and its calibration remains stable for extended periods. However, path averaging limits use of this type of anemometer to heights of 4 meters and above.

In the case of anemoclinometers, which are small in size, the wind velocity components are determined from pressure differences between the various sets of points on a metal sphere. The frequency response is reasonably good, limited only by the time constant of pressure transducers, but the probe needs to be oriented into the wind.

Remote wind velocity measurements in the atmosphere using laser doppler methods have also been reported. These methods are nonintrusive, have advantages of remote sensing in inacessible locations, and provide good velocity resolution. However, they require powerful lasers and rather delicate signal processing equipment.

Finally, the three axis propeller anemometers and the propellers-on-bivane anemometers are simple in design and moderate in cost. However, these anemometers are hampered by the limitations on their response, inherent in their structures.

It is the primary object of this invention to provide an anemometer utilizing a radionuclide counting technique that measures both velocity and direction of wind.

Another object of the invention is provide an anemometer that could be portable and yet not too fragile.

A further object of the invention is to provide a small economical anemometer that requires low power.

Still another object of this invention is to provide an anemometer that can be used for extended periods of time even in remote inhospitable places which are not easily accessible.

Other objects and advantages of this invention will become apparent hereinafter.

SUMMARY OF THE INVENTION

The invention consists essentially of a pendulum with a source of radiation on the free end of the pendulum. Three radiation detectors are equally spaced along the circumference of a circle in a plane perpendicular to the pendulum, when the pendulum is in its neutral position such that all three of the detectors are the same distance from the radiation source when the pendulum is in its neutral position. Consequently, when there is wind the radiation source will be moved to a position indicative of velocity and direction of the wind. Means are provided for obtaining the ratio of outputs of a first and second of the detectors and for obtaining the ratio of the outputs of the second and third of the detectors. The two ratios are processed by a processing means to obtain the velocity and the direction of the wind.

In a first embodiment of the invention the pendulum is a ball attached to the free end of the pendulum with a source of radiation on the ball. In a second embodiment of the invention the pendulum includes a first ball located between the two ends of the pendulum and a lighter second ball attached to the free end of the pendulum with sources of radiation on both balls.

DETAILED DESCRIPTION OF THE INVENTION

Figure 1:
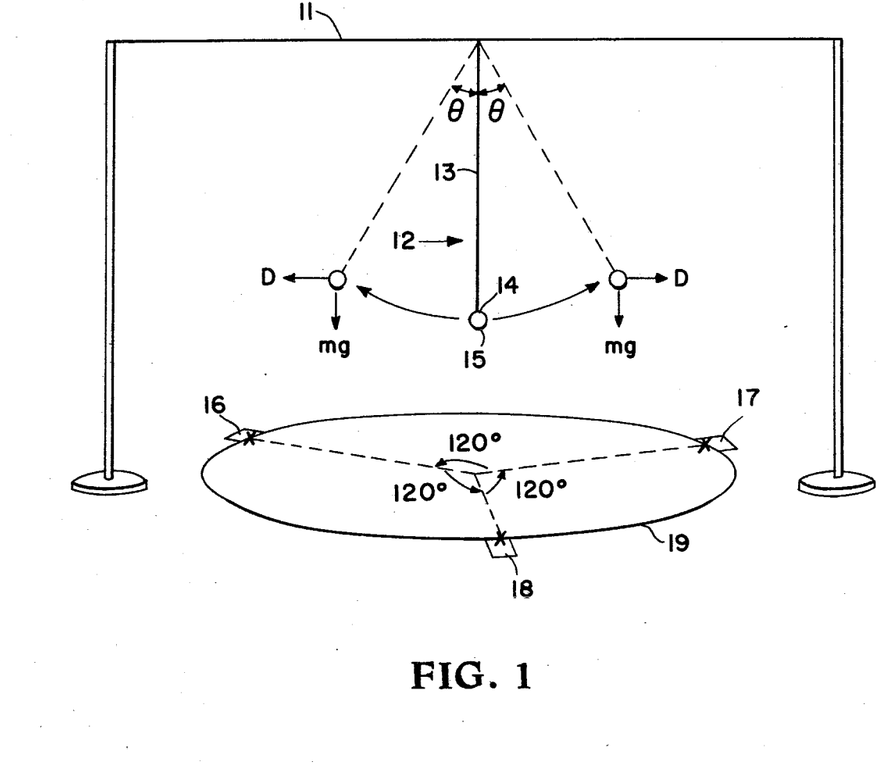
FIG. 1 is a schematic diagram of a first embodiment of the invention.

Turning now to one embodiment of the invention selected for illustration in the drawings, the number 11 of FIG. 1 designates a support for a pendulum 12. Pendulum 12 consists of a flexible wire 13 with a light, hollow sphere 14, such as a plastic tennis ball attached to its free swinging end. Ball 14 is punctured with symmetrically distributed holes or otherwise appropriately roughened for aerodynamic stability. A radiation source 15 such as for example, a one-microcurie bismuth-207 electron source, is deposited on the lower surface of ball 14. A detector 16, a detector 17 and a detector 18 are located in a plane perpendicular to pendulum 12 when the pendulum is in its neutral position. Detectors 16, 17 and 18 are radiation counters. The neutral position of pendulum 12 is the position shown in FIG. 1 (the position of the pendulum with no wind). Detectors 16, 17 and 18 are located on a circle 19, 120° apart, and equidistance from the radiation source 15 when pendulum 12 is in its neutral position. The counting rate of each of the detectors is dependent on the solid angle subtended by the radiation counter at the location of the radioactive source.

Figure 2:
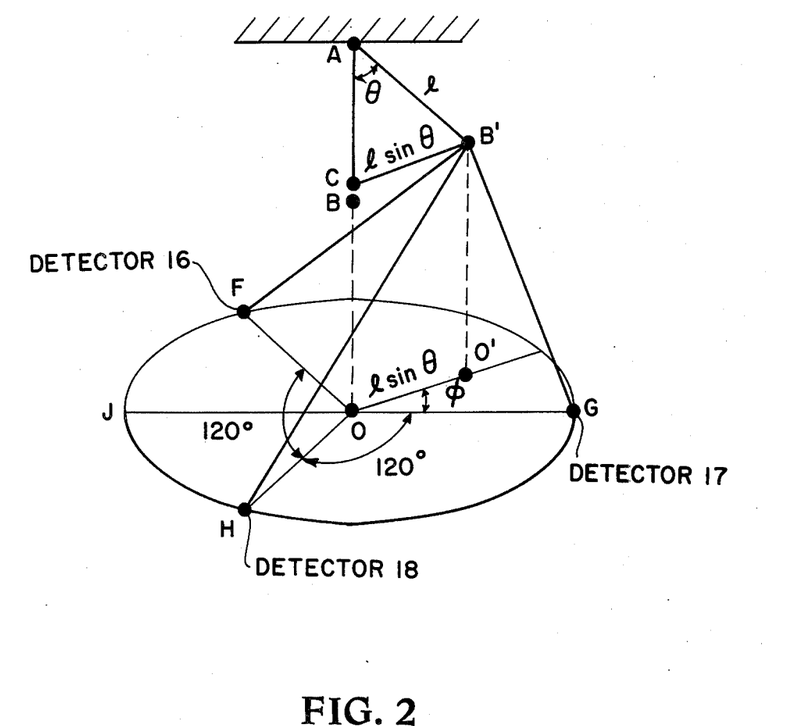
FIG. 2 is a schematic diagram for illustrating the effect of wind on the source counter geometry of FIG. 1.

Now suppose there is a wind in a direction parallel to the plane containing detectors 16, 17 and 18. Ball 14, and consequently radiation source 15, will be displaced from the neutral (no wind) position. The relative counting rates in the three detectors will depend on the new position of radiation source 15. As shown in FIG. 2 the source ball 14 (B) is displaced through an angle $(\theta,\phi)$ to position B' under the influence of drag D imposed on it by wind velocity V. The distance $d_i$ between the displaced position of the source ball and the three detectors are given by $$d_1 = B'F = \{[h + l(1 - \cos\theta)]^2 + r^2 + r^2\sin^2\theta - 2rl\sin\theta\cos(120 - \phi)\}^{\frac{1}{2}} \quad (1)$$

$$d_2 = B'G = \{[h + l(1 - \cos\theta)]^2 + r^2 + r^2\sin^2\theta - 2rl\sin\theta\cos\phi\}^{\frac{1}{2}}$$

$$d_3 = B'H = \{[h + l(1 - \cos\theta)]^2 + r^2 + r^2\sin^2\theta - 2rl\sin\theta\cos(120 + \phi)\}^{\frac{1}{2}}$$

where h is the height of the undisturbed source ball from the counter plane; l is the length of the suspension string; r is the radius of the counter circle; and F, G, and H are the respective locations of detectors 16, 17 and 18. Thus, the counting rates $C_i$ in the three detectors will be $$C_1 = N\alpha_1(\theta,\phi)G_1(\theta,\phi)\epsilon_1(\theta,\phi)$$
$$C_2 = N\alpha_2(\theta,\phi)G_2(\theta,\phi)\epsilon_2(\theta,\phi) \quad (2)$$
$$C_3 = N\alpha_3(\theta,\phi)G_3(\theta,\phi)\epsilon_3(\theta,\phi)$$

where N represents the number of source radiations (particles) emitted per second, and $\alpha_i$, $G_i$, and $\epsilon_i$ represent the source self-absorption correction factor, the solid angle correction factor, and the radiation detection efficiency, respectively, for the ith detector. The source geometrical correction factor $G_i(\theta,\phi)$ is related to $d_i$ by the equation $G_i(\theta,\phi) = S_i(\theta,\phi)/d_i^2$, where $S_i$ represents the detector surface area normal to $d_i$.

By calculating the relative counting rates $R_{ij}$ in the three pairs of detectors for various combinations of $\theta$ and $\phi$, it is possible to develop theoretical calibration curves of $R_{ij}(\theta,\phi)$ versus $\theta$ and/or $\phi$. Such calibration curves can then be used to determine the displaced source ball position under the test wind field. The direction of the source ball displacement $\phi$ is the same as the wind direction. The magnitude of the source displacement angle $\theta$ is related to the wind speed as follows:

$$\tan\theta = (D/mg) \quad (3)$$

where $$D = \tfrac{1}{2}(C_D\rho A)V^2 \quad (4)$$

Substituting for D in equation (3) gives $$\tan\theta = \left(\frac{C_D\rho A}{2mg}\right)V^2 = kV^2 \quad (5)$$

where $$k = C_D\rho A/2mg \quad (6)$$
$m$ = source ball mass
$C_D$ = steady sphere drag coefficient
$\rho$ = density of the atmosphere
$V$ = wind velocity The value of the constant k can be easily determined by using appropriate values for the various parameters in equation (6). Thus, for $C_D=0.47$ (drag coefficient for a smooth, unperforated, spherical source ball), $\rho=1.23\times 10^{-3}$ g-cm$^{-3}$ (Earth), $\rho=1.32\times 10^{-5}$ g-cm$^{-3}$ (Mars), A=5 cm$^2$, m=10 grams, g=981 cm-sec$^{-2}$ (Earth) and g=375 cm-sec$^{-2}$ (Mars), k is calculated to be $1.47\times 10^{-7}$ cm$^{-2}$-sec$^2$ for Earth and $3.85\times 10^{-9}$ cm$^{-2}$-sec$^2$ for Mars. Based on a calculation of k and measurement of source ball displacement angle $\theta$, the wind speed is easily calculated using equation (5). As is evident from equation (5), the sensitivity of the instrument would be greatly dependent on the value of the source displacement angle $\theta$. The source ball mass should therefore be so adjusted as to keep $\theta<45°$.

It should perhaps be pointed out that a value of $C_D=0.47$ for a spherical source ball is correct only in the case of an unperforated ball. If the source ball has to be perforated or otherwise roughened for reasons of aerodynamic stability, the value of $C_D$ could increase significantly, depending on the size, number, and distribution of the perforations or the surface roughness parameter.

Although the individual counting rates in individual counters $C_i$ and the relative counting rate in any pairs of counters $R_{ij}$ can be easily calculated from equations (2), it may be more expedient to use experimentally obtained data on counting rate ratio in order to avoid possible complications caused by slow drifts in radiation detector efficiencies as well as changes in electronic system gains. Such calibration curves were developed using experimentally obtained counting rate data in the individual detectors which are disclosed in FIGS. 3–8.

Figure 3:
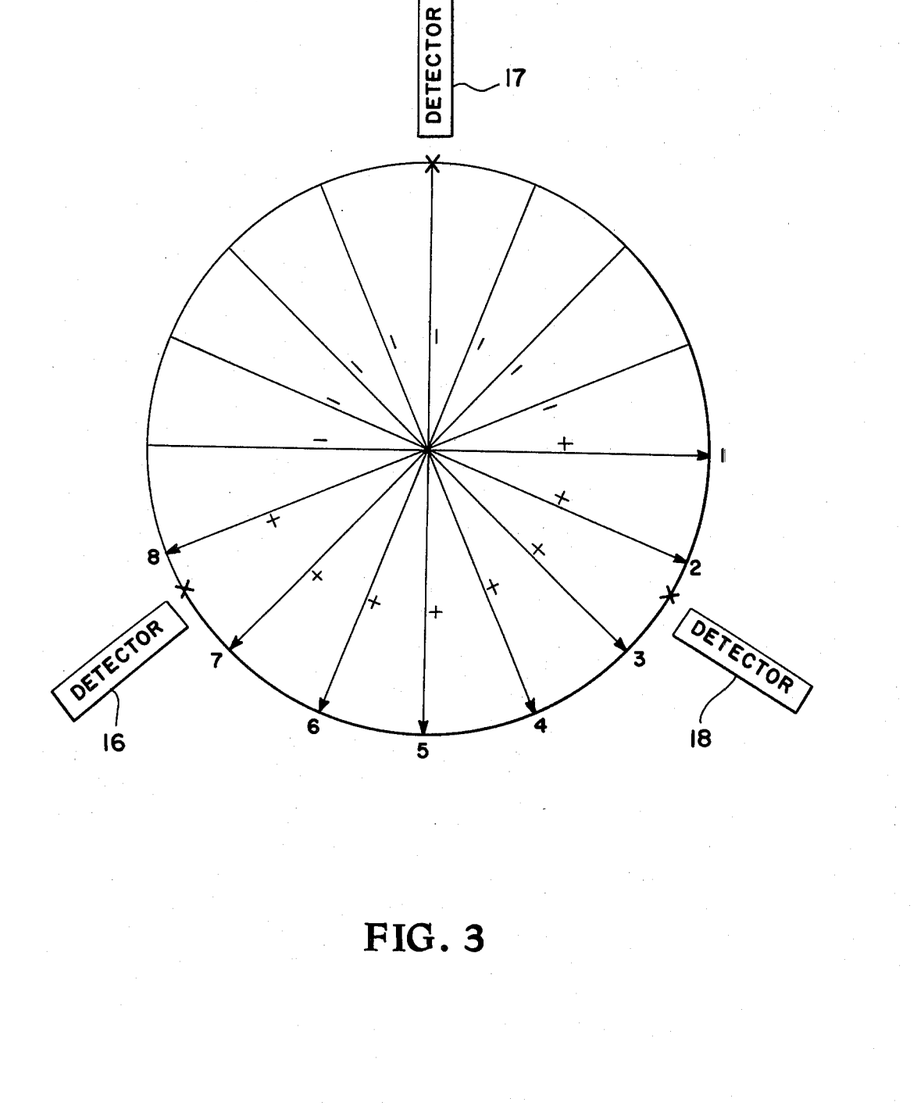
FIG. 3 shows the source motion relative to the three counters in FIG. 1.

To develop the calibration curves three Geiger-Müller tubes (detectors 16, 17 and 18) were located at equal distances along the circumference of circle 19 having a diameter of 0.3-m. A one-microcurie bismuth-207 electron source 15 was attached to the bottom of a 0.025-m-diameter, plastic, hollow sphere ball 14. (1 microcurie equals $3.7 \times 10^4$ becquerels.) The ball was suspended from a rod at a height of 0.15 m from the Geiger-Müller counter plane. The source ball was moved along straight lines inclined at different angles with respect to the three counters in order to simulate different wind velocities. These lines 1 through 8, called configurations, are shown in FIG. 3.

Figure 4:
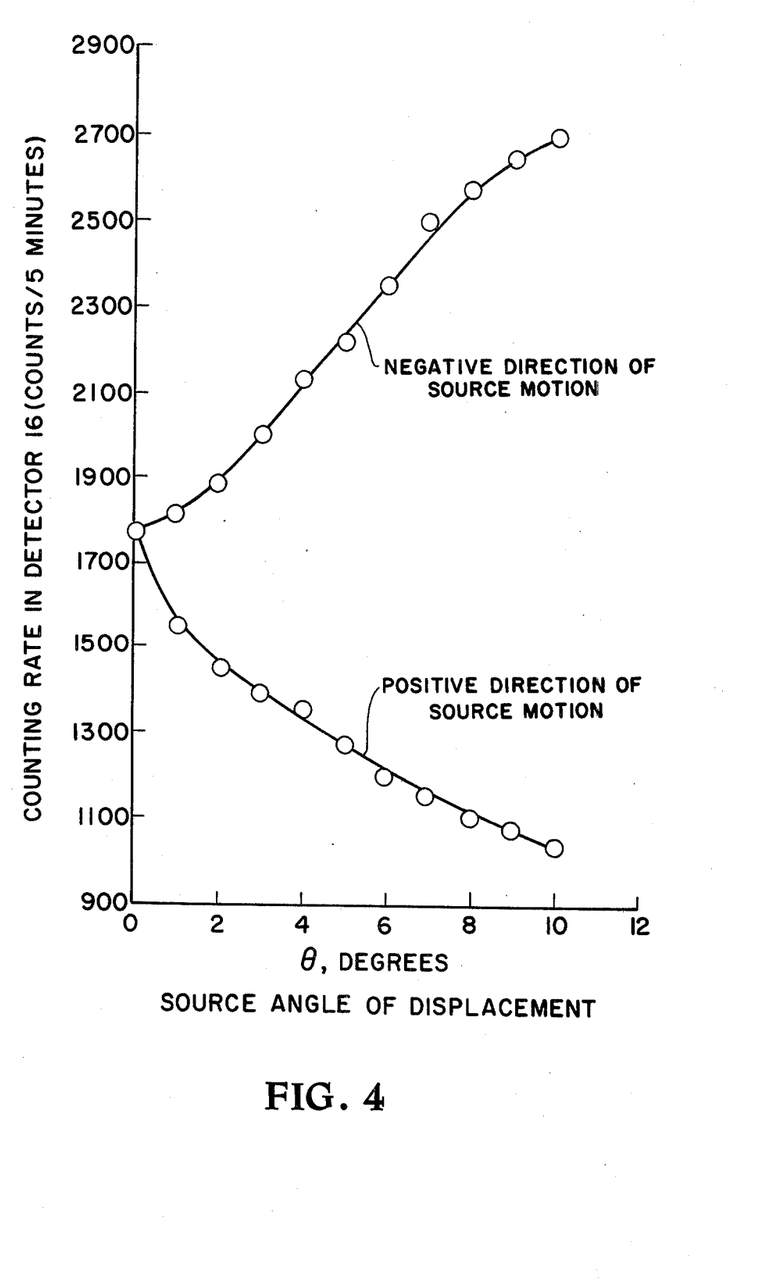
FIGS. 4, 5 and 6 show plots of the counting rate of detectors 1, 2 and 3 (labeled 16, 17 and 18, respectively) versus source angle displacement for configuration 2 in FIG. 3.
Figure 5:
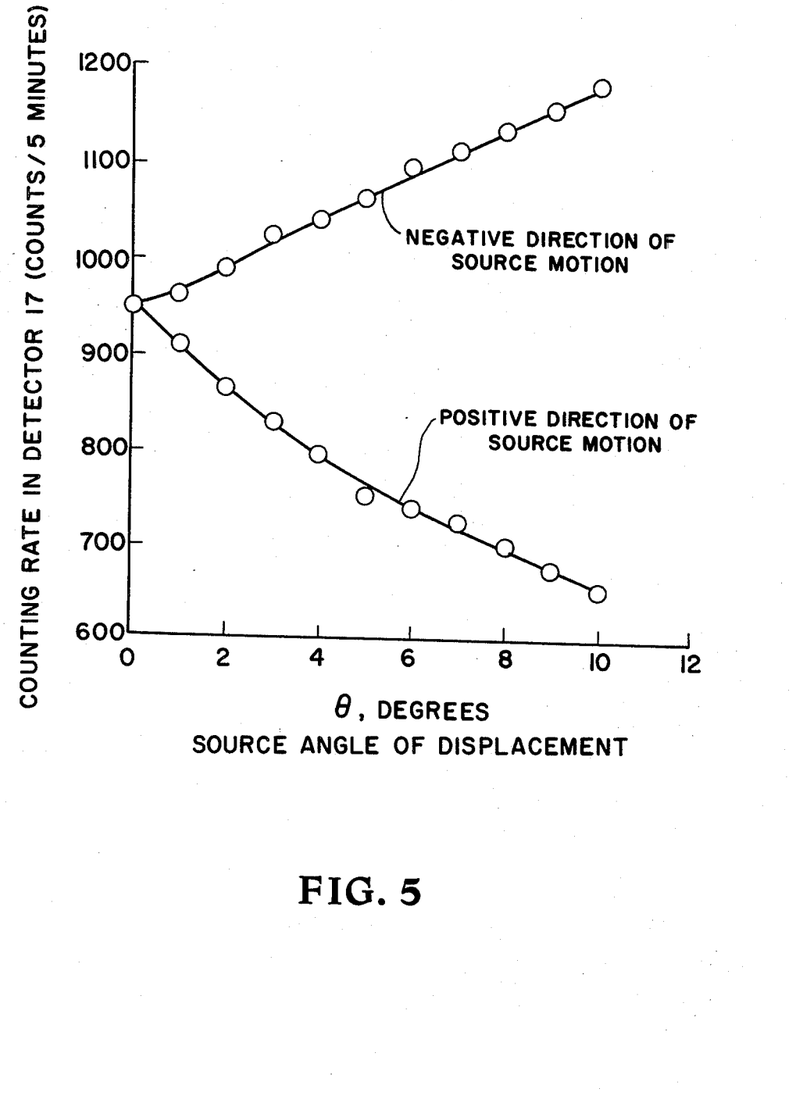
Figure 6:
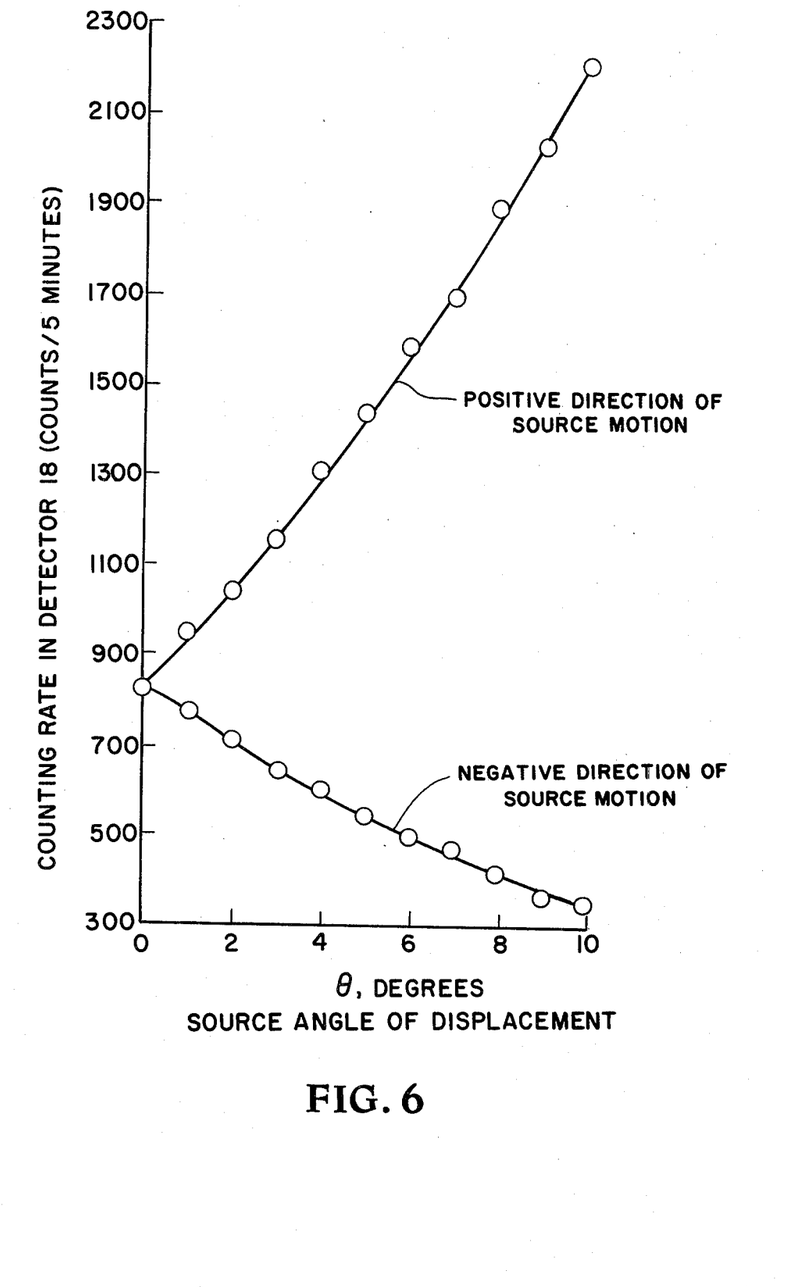
Figure 7:
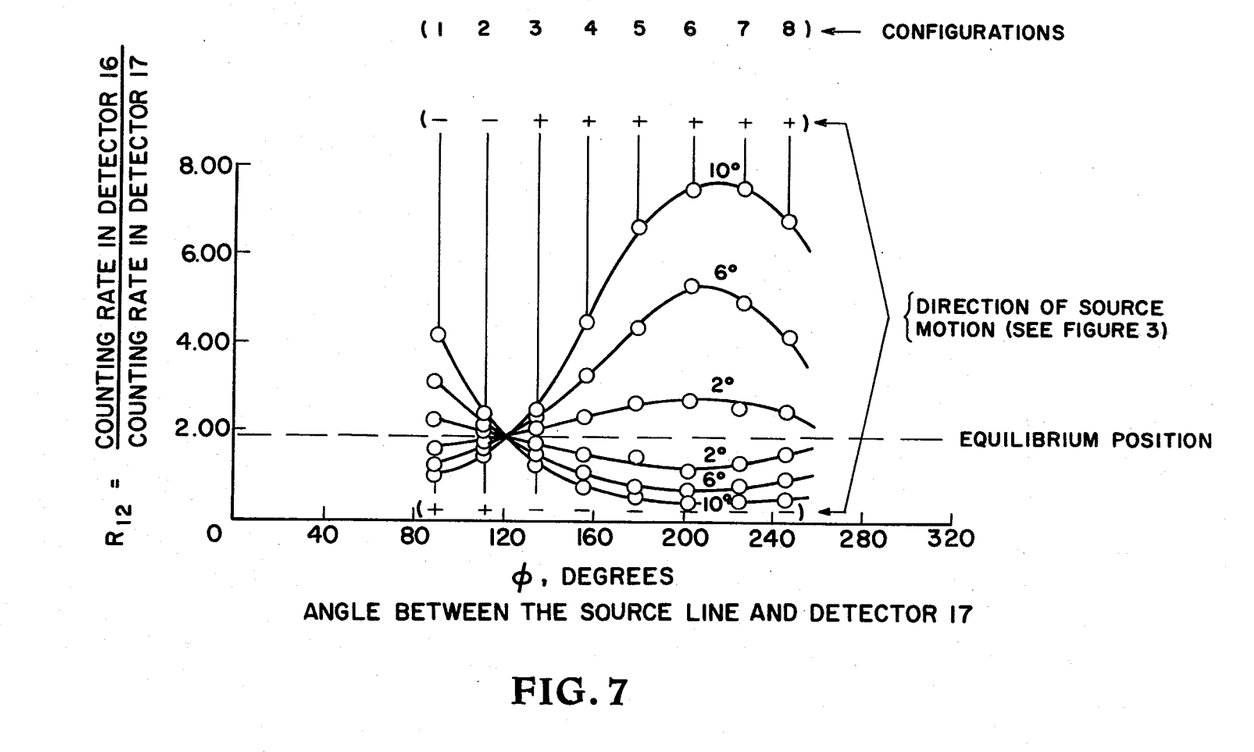
FIG. 7 shows plots of the ratio of the counting rates of detectors 1 and 2 versus the angle between the source line and detector 2.
Figure 8:
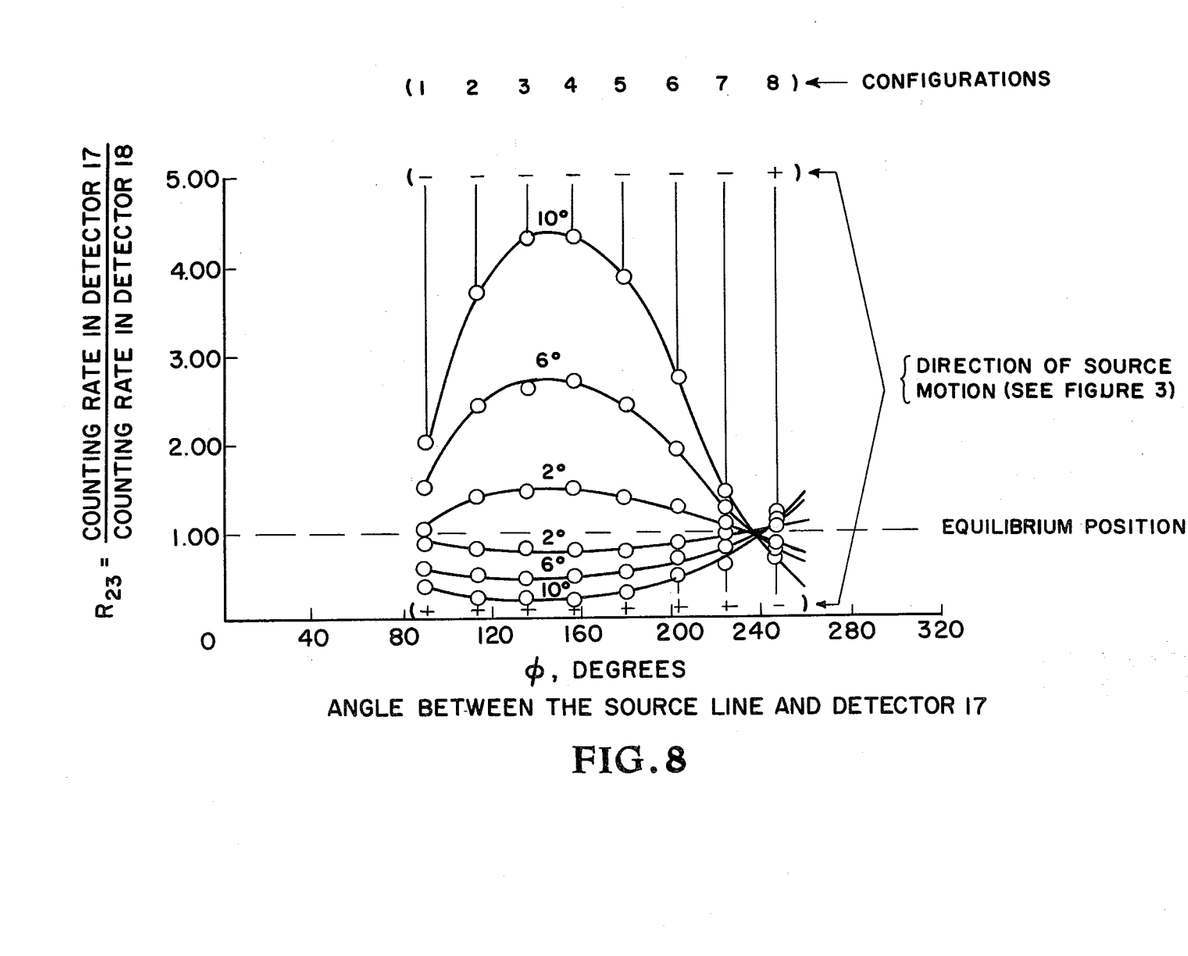
FIG. 8 shows plots of the ratio of the counting rates of detectors 2 and 3 versus the angle between the source line and detector 2.

Counting rates in the three detectors were measured for a preselected time for different source-counter configurations. FIGS. 4, 5 and 6 show individual counting rates in the three detectors as a function of angle of displacement of the source ball from the local vertical for configuration 2 in FIG. 3. Note that the counting rates for the three detectors are different at $\theta = 0$ where one would expect the rates to be the same. Different counting rates in the three detectors arise from the fact that they did not have identical radiation detection efficiencies. However, these different counting rates for the detectors will not affect the accuracy, since as discussed below counting rate ratios are used. From the data of the type shown in these figures relative counting rates were determined for the detector pairs (16,17), (17,18), and (18,16). FIGS. 7 and 8 show relative counting rates for detector pairs (16,17) ($R_{12}$) and for detector pairs (17,18) ($R_{23}$) for various configurations.

It is clear from FIGS. 7 and 8 that the source-counter configuration, and hence the direction of motion of the source ball with respect to a predetermined reference line, can be easily determined from the measured values of the relative counting rates in the three detectors. For example, if the ratio of the counting rates for detectors 16 and 17 ($R_{12}$) is 4.18 and the corresponding value for detectors 17 and 18 ($R_{23}$) is 2.00, then the source is displaced through an angle $\theta = 10°$ in configuration 1(−). Similarly, if $R_{12} = 2.00$ and $R_{23} = 1.40$, the source is displaced through an angle $\theta = 2°$ in configuration 2(−). A noteworthy feature of FIGS. 7 and 8 is that appropriate combinations of detector channels permit a reasonably uniform sensitivity across the entire angular range $\phi$.

Figure 9:
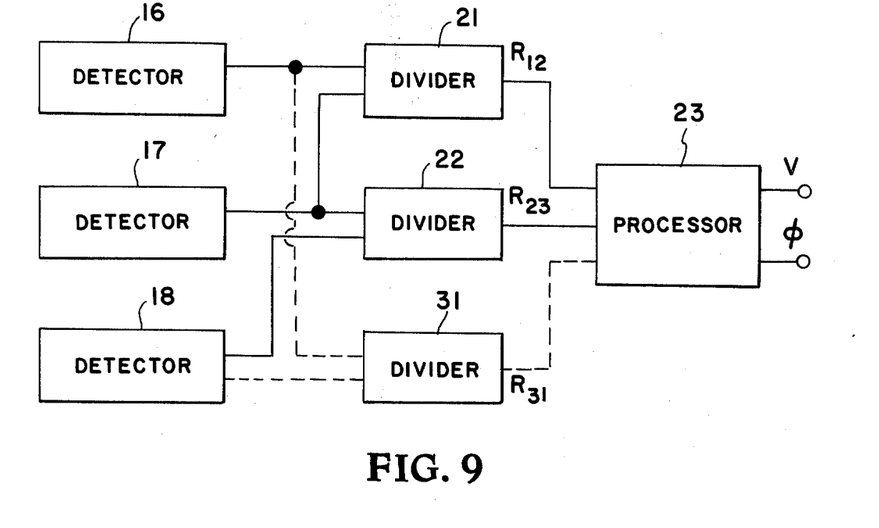
FIG. 9 is a block diagram of the circuitry used with FIG. 2.

In view of the discussion above, the outputs of detectors 16 and 17 are applied to a divider 21 to obtain the ratio $R_{12}$ of the output of detector 16 to the output of detector 17; and the outputs of detectors 17 and 18 are applied to a divider 22 to obtain the ratio $R_{23}$ of the output detector 17 to the output of detector 18. The ratios $R_{12}$ and $R_{23}$ from dividers 21 and 22 are applied to a processor 23 which stores the calibration information shown in FIGS. 7 and 8. The values for $\theta$ and $\phi$ are taken from FIGS. 7 and 8 for each $R_{12}$, $R_{23}$ combination and the values for $\theta$ are used to calculate corresponding values of V by means of equation (5). Then the values for V and $\phi$ are stored in processor 23. As stated above, this information can also be calculated and stored in processor 23. In response to the measured $R_{12}$ and $R_{23}$ values, the corresponding V and $\phi$ values are selected and applied to the outputs of the processor. Processor 23 can be a programmable read only memory (PROM) which is well known and commercially available.

Alternatively, processor 23 can be a computer, which in response to $R_{12}$ selects the corresponding set of $(\theta,\phi)$ values from the FIG. 7 data and in response to $R_{23}$ selects the corresponding set of $(\theta,\phi)$ values from the FIG. 8 data. Then the processor obtains the intersection of the two selected sets to provide the $(\theta,\phi)$ corresponding to the $R_{12}$ and $R_{23}$ inputs. Processor 23 then calculates the value of V from $\theta$ by use of equation (5) to produce the values of V and $\phi$ at its two outputs corresponding to the inputs $R_{12}$ and $R_{23}$. A third divider 31 can be used to provide $R_{31}$; the ratio of the output of detector 18 to the output of detector 16. $R_{31}$ may be needed to provide a uniform sensitivity across the entire angular range $\phi$.

Certain atmospheric environments experience large changes in wind speed. In order to measure wind speeds with reasonably uniform sensitivity over these wide ranges with the FIG. 1 embodiment of the invention, it is necessary to use either a series of instruments with overlapping ranges or a single instrument with an adjustable source ball weight and/or size. Neither of these two alternatives appears to be satisfactory for practical reasons.

Figure 10:
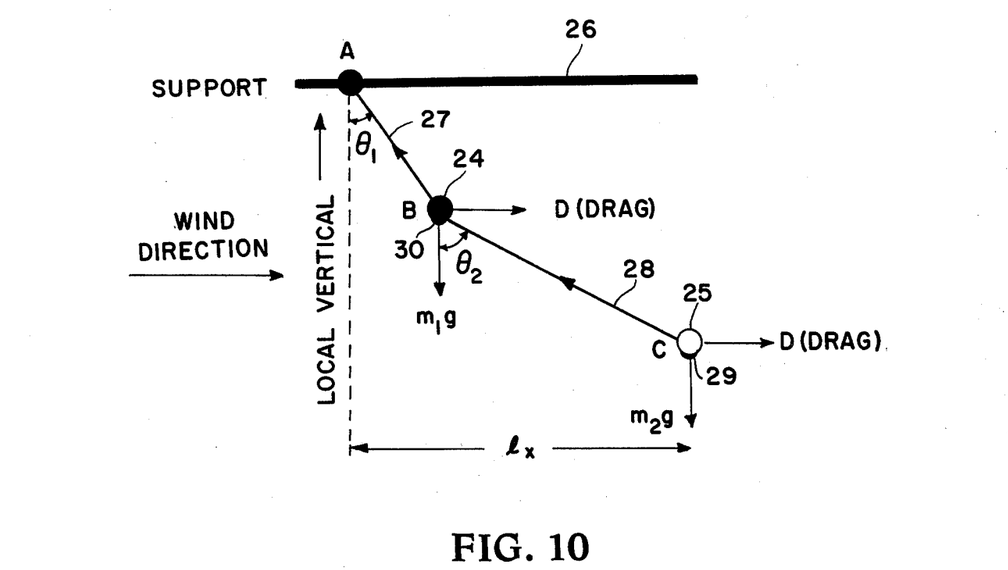
FIG. 10 is a schematic diagram of a second embodiment of the invention.

For use in large changes in wind speed a second embodiment of the invention as shown in FIG. 10 involves the use of a double pendulum incorporating a heavier, metallic ball 24 of the same dimensions as the lighter, plastic source ball 25. For lower velocities, the lighter source ball 25 will be displaced a considerable amount, while the heavier, metallic ball 24 will barely move from its normal equilibrium position. For higher velocities, the source ball will be displaced through almost 90°, but the displacement of the heavier ball will be much less, thus offsetting the loss of sensitivity associated with larger angles of source ball deflection. By a proper system design, it is possible to keep the impact of the wake of the upper heavier ball on the lighter source ball to a minimum, thus ensuring its stability. Such a double pendulum system is described below. For the sake of simplicity, the problem of source ball displacement is discussed in one dimension only, but the treatment can be easily extended to three dimensions.

Consider two balls of masses $m_1$ and $m_2$. The first (heavier, metallic ball 24) is attached to a fixed support 26 by a light inextensible string 27 of length $l_1$. The second (lighter, plastic source ball 25) is attached to the bottom of the first ball by a similar string 28 of length $l_2$. If the two balls have the same diameter and similar surface roughness characteristics, the drag force on them will be equal, and the equilibrium conditions can be described by the following equations:

$$\tan \theta_1 = \frac{2D}{(m_1 + m_2)g}$$

$$\tan \theta_2 = \frac{D}{m_2 g}$$

where $\theta_1$ is the angle of displacement of the first, heavier ball, and $\theta_2$ is the angle of displacement of the second, lighter ball.

These equations can be used to design a system that is appropriate for a wide range of wind velocities. The sensitivity of such a system will depend strongly on the rate of change of the source ball position with wind speed. For the one-dimensional case, one obtains $$(dl_x/dV) = 4k_1 l_1 V \cos^3 \theta_1 + 2k_2 l_2 V \cos^3 \theta_2$$

where $l_x$ is the displacement of the source ball from its normal undisturbed position and $$k_1 = \frac{C_D \rho A}{2(m_1 + m_2)g}$$

$$k_2 = \frac{C_D \rho A}{2m_2 g}$$

In the case of a single pendulum anemometer, the corresponding equation is $$(dl_x/dV) = 2k_1 V \cos^3 \theta$$

Figure 11:
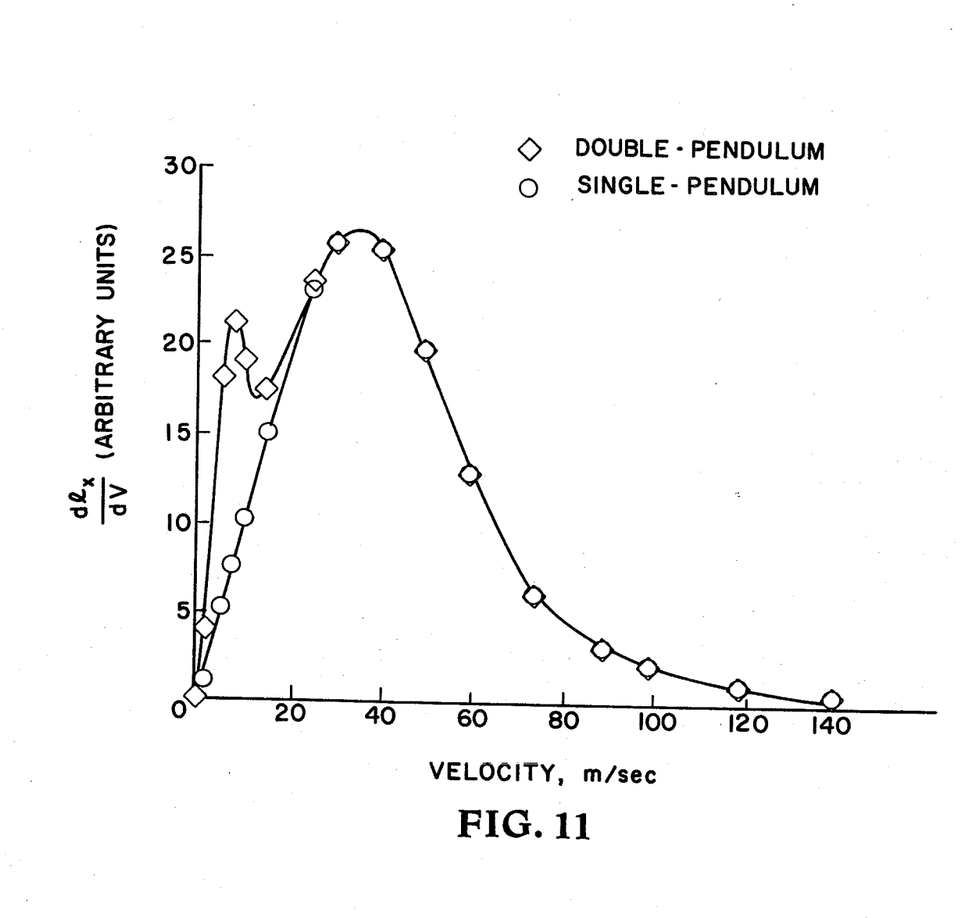
FIG. 11 is a comparison of the sensitivity of the FIG. 1 and FIG. 10 embodiments of the invention for various values of wind velocity.

FIG. 11 shows a graph of $dl_x/dV$ as a function of velocity for single and double pendulum arrangements for a specific case. It is apparent that the use of a heavy compensating ball considerably improved the uniformity of response of the instrument.

It should be emphasized, however, that a part of the suspension string of the lower source ball may be exposed to the wake of the first ball at higher wind speeds, thus making the position of the source ball unstable. If proper mechanical design does not alleviate the problem, one of the following two approaches might provide the solution:

(1) Use alpha counting for lower wind speeds and electron counting for higher wind speeds. This can be accomplished by depositing americium-241, an alpha source 29, on the lower (lighter) ball and bismuth-207, an electron source 30, on the upper (heavier) ball and using a retractable, thin ($<1$ mg/cm$^2$) metal absorber in front of each detector. Both electrons and alpha particles would be counted at lower speeds when the absorber foil would be retracted, whereas only electrons would be counted at higher speeds when the absorber foil would be introduced in front of each detector. Thus, any instability in the position of the lower (lighter), americium-241 bearing ball at higher speeds will not affect the counting rates, which will be affected only by the position of the upper (heavier) ball bearing bismuth-207, an electron emitter.

(2) Use a reversible double pendulum system wherein each ball will have bismuth-207 sources of equal strength deposited on it. For lower speeds (5 to 20 m/sec), the lighter ball will be suspended below the heavier ball, whereas these positions will be reversed at higher speeds (20 to 100 m/sec). By a suitable adjustment of the source weights and suspension string lengths, the lower ball can almost always be kept out of the wake of the upper ball.

The invention is a technique for measuring wind speeds over a wide range (up to 100 m/sec). The technique is based on the inverse-square-law variation of the counting rate as the radioactive source-to-counter distance is changed by the movement of the source due to wind velocity. An anemometer based on this principle is usable in all noncorrosive media and in all locations, except places with no local gravitational force. It is suitable for measuring wind fluctuation rates of up to 1 kHz, being limited only by the inherently slower mechanical response functions of the suspension system.

Even though the discussions presented have assumed that the radiation counters are in a plane normal to the local vertical and that the wind direction is parallel to the counter plane, cases when the counter plane is not normal to the local vertical and when the wind is moving at an angle other that 90° to the local vertical can be easily treated by appropriately modifying the calibration constant of the instrument. The presence of a vertical wind component introduces lift in addition to the drag caused by the horizontal component, thus requiring a change in the calibration constant. This type of wind motion, however, is not usually encountered near terrestrial or planetary surfaces.

Geiger-Müller tubes and a weak electron source were used in the system described herein. It may, however, be preferable to use semiconductor counters and stronger radioactive sources for higher accuracy as well as higher frequency response. It may also be necessary to use gamma radiation sources in certain terrestrial applications.

What is claimed as new and desired to be secured by Letters Patent of the United States is:

1. A method for measuring wind velocity and direction comprising the steps of:
    providing a radiation source on the end of a pendulum with the pendulum being substantially perpendicular to the wind direction when in its no wind position and with the pendulum moving the radiation source to a position indicative of both the velocity and direction of the wind when there is wind;
    measuring the radiation from the radiation source at three equally spaced locations on a circle in a plane perpendicular to said pendulum in its stable position;
    obtaining two ratios of the three measurements of the radiation from the radiation source; and
    determining from the two ratios the velocity and direction of the wind.

2. An anemometer for measuring both the velocity and direction of wind comprising:
    a pendulum which in its no wind position is essentially perpendicular to wind direction;
    a source of radiation on the free end of said pendulum;
    three radiation detectors equally spaced in a plane perpendicular to said pendulum when the pendulum is in its no wind position such that all three of the detectors are the same distance from the radiation source when the pendulum is in its no wind position for detecting the radiation from said source of radiation;
    means connected to the outputs of a first and second of said three radiation detectors for obtaining a ratio of outputs of said first and second detectors;
    means connected to the outputs of the second and third of said three radiation detectors for obtaining a ratio of the outputs of the second and third detectors; and
    processing means receiving said ratio of the outputs of the first and second detectors and said ratio of the outputs of the second and third detectors for determining the velocity and the direction of the wind.

3. An anemometer according to claim 2 wherein said processing means includes means for storing the plot of ratios of the outputs of the first and second detectors versus wind direction and versus wind velocity and the plot of the ratios of the outputs of the second and third detectors versus wind direction and versus wind velocity and means responsive to the ratio of the outputs of the first and second detectors and the ratio of the outputs of the second and third detectors for selecting from said storing means the corresponding wind direction and wind velocity.

4. An anemometer according to claim 2 wherein said pendulum includes a ball attached to its free end with said source of radiation on said ball.

5. An anemometer according to claim 2 wherein said pendulum includes a first ball located between the two ends of the pendulum and a lighter second ball attached to the free end of the pendulum with said source of radiation on said second ball.

* * * * *